(12) United States Patent
Sitzmann et al.

(10) Patent No.: US 7,137,599 B1
(45) Date of Patent: Nov. 21, 2006

(54) LAUNCHER WITH DUAL MODE ELECTRONICS

(75) Inventors: Richard Lee Sitzmann, Tucson, AZ (US); Gregory Alan Wilkinson, Tucson, AZ (US)

(73) Assignee: Raytheon Company, Lexington, MA (US)

( * ) Notice: Subject to any disclaimer, the term of this patent is extended or adjusted under 35 U.S.C. 154(b) by 109 days.

(21) Appl. No.: 10/832,209

(22) Filed: Apr. 26, 2004

(51) Int. Cl.
  *B64D 7/08* (2006.01)
  *B64D 1/04* (2006.01)
(52) U.S. Cl. ................................. 244/137.4; 244/3.1
(58) Field of Classification Search ................ 244/2, 244/3.1, 137.4; 102/293; 701/3
  See application file for complete search history.

(56) References Cited

U.S. PATENT DOCUMENTS

| 5,541,839 | A |   | 7/1996 | Mitzkus et al. |
| 5,548,510 | A |   | 8/1996 | Ebert et al. |
| 5,931,874 | A | * | 8/1999 | Ebert et al. ................ 701/1 |
| 6,122,569 | A |   | 9/2000 | Ebert et al. |
| 6,615,116 | B1 |  | 9/2003 | Ebert et al. |
| 6,941,850 | B1 | * | 9/2005 | McMahon ................ 89/1.811 |
| 2003/0033059 | A1 | | 2/2003 | Ebert et el. |

FOREIGN PATENT DOCUMENTS

EP  1 001 242  5/2000

OTHER PUBLICATIONS

'Joint Direct Attack Munition (JDAM) Design.' Global Security.org, p. 1-4 [retrieved online Nov. 5, 2003]. http://www.globalsecurity.org/military/system/munitions/jdam-design.htm.
'What's New With Smart Weapons' Global Security.org. p. 1-4 [retrieved online Nov. 5, 2003]. http://www.globalsecurity.org/military/system/munitions/intro-smart.htm.
Written Opinion of International Searching Authority for International Application No. PCT/US2005/013759.

* cited by examiner

*Primary Examiner*—Robert P. Swiatek
(74) *Attorney, Agent, or Firm*—Renner, Otto, Boisselle and Sklar, LLP

(57) ABSTRACT

A system and method for interconnecting analog legacy stores to both legacy and modern aircraft. One aspect of the invention provides for a dual mode launcher having a first interface for interfacing with a modern aircraft and a second interface for interfacing with a legacy aircraft. Either the first or the second interface is connected to the aircraft depending on the hardware platform supported by the aircraft. Signals received from either interface are converted to digital and placed on a digital input/output bus and converted to analog for use by the store. Likewise, signals transmitted by the store to the aircraft are converted to digital and placed on the digital input/output bus for transmission to the aircraft. The signals are further acted upon depending upon which interface is connected to the dual mode launcher assembly. The dual mode launcher provides seamless operation of the store interface regardless of which type of aircraft is equipped to carry the analog store.

25 Claims, 4 Drawing Sheets

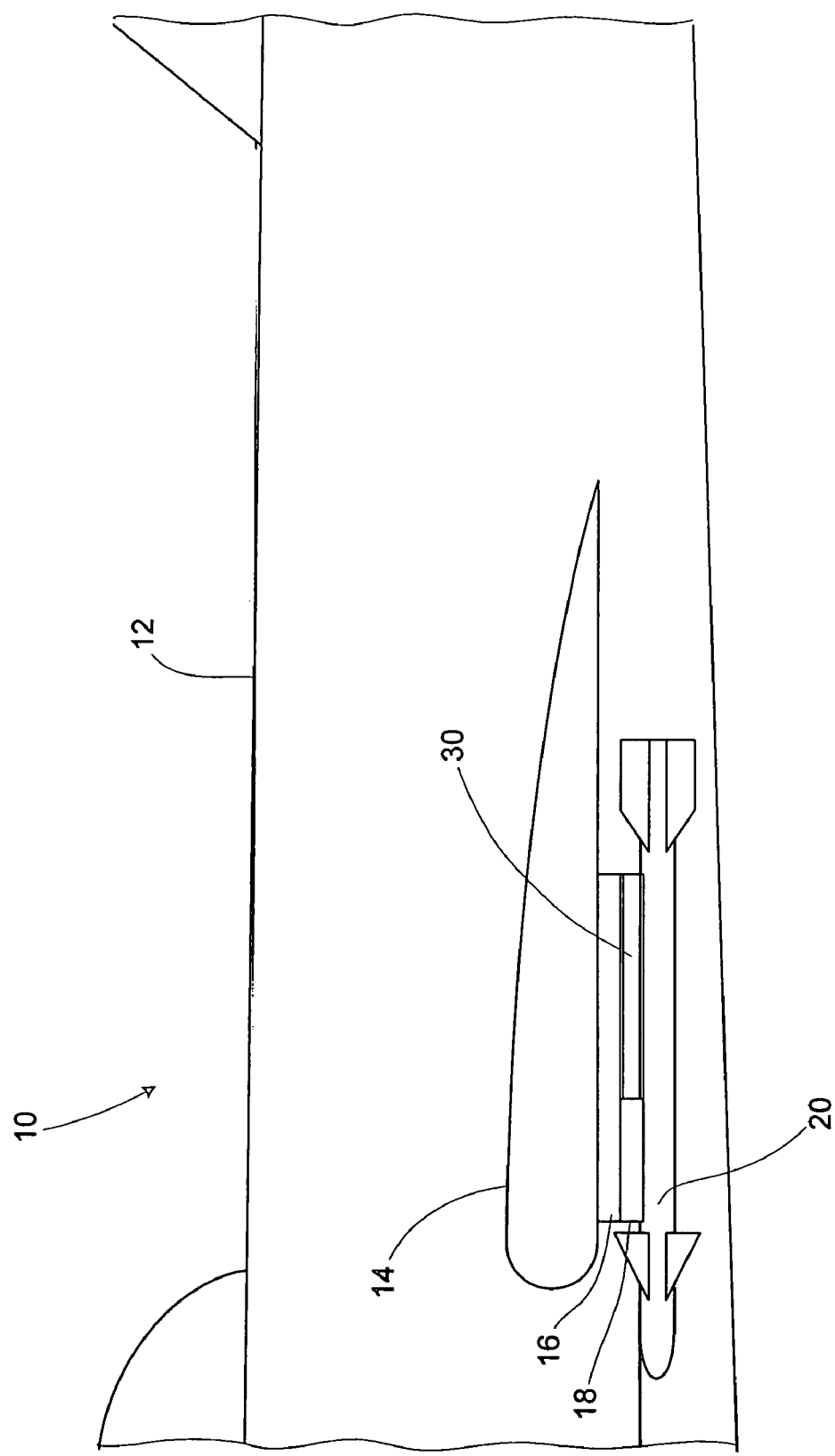

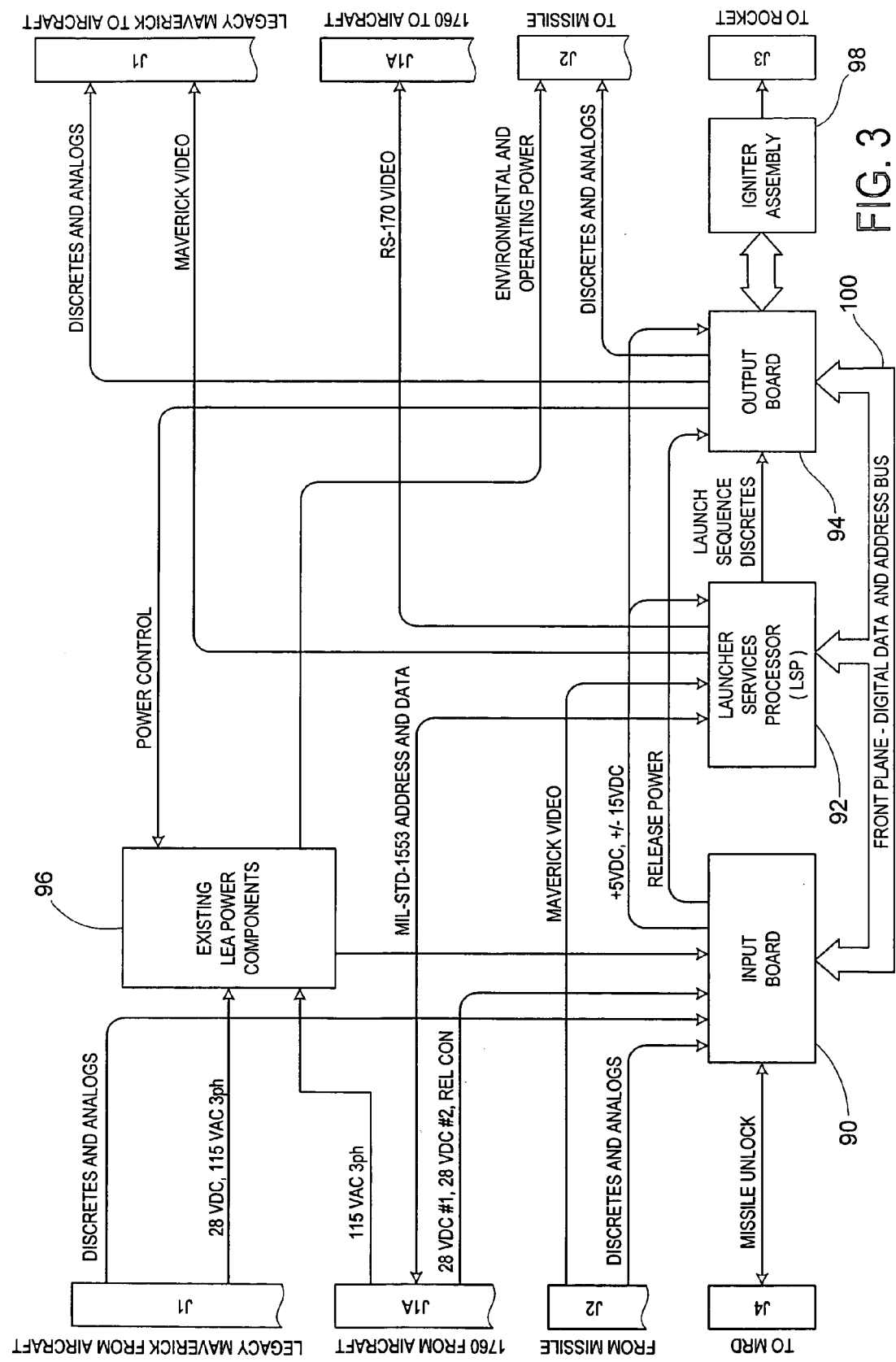

LAUNCHER WITH DUAL MODE ELECTRONICS

TECHNICAL FIELD

The present invention relates generally to aircraft and aircraft stores. More specifically, the present invention relates to a dual mode interface for interconnecting analog legacy stores to both legacy and modern aircraft.

BACKGROUND OF THE INVENTION

Until recently, an aircraft and the stores which it carried were typically developed independently of each other or were developed exclusively for each other. This practice usually resulted in unique aircraft/store electrical interconnection requirements, the general proliferation of overall store interface designs, low levels of interoperability, and costly aircraft modifications to achieve required store utilization flexibility. Trends in store technology toward more complex store functions requiring increasing amounts of avionics data and control information from aircraft systems were predicted to lead to a multitude of aircraft/store interfacing problems.

In late 2003, the U.S. Department of Defense promulgated MIL-STD-1760 revision D (hereinafter referred to MIL-STD-1760). The stated goal of MIL-STD-1760 is to develop aircraft that are compatible with a wide variety of stores and stores that are compatible with a wide variety of aircraft. MIL-STD-1760 accomplishes this goal by defining a standard electrical (and fiber optic) interconnection system for aircrafts and stores. This interconnection system is based on the use of a standard connector, a standard signal set and a standard serial digital interface for control, monitor, and release of stores.

Newly produced tactical aircraft are internally wired with the MIL-STD-1553 databus for coupling to the MIL-STD-1760 standard weapons interface. Modern smart weapons such as the Joint Direct Attack Munition (JDAM) are designed to communicate with the aircraft via such interface to obtain control, monitor and release information from the aircraft in order to carry out mission critical operations.

Unfortunately, the overwhelming majority of legacy stores in use today are not properly equipped to interface with the MIL-STD-1760 interface of modern tactical aircraft. One such legacy store is the Maverick family of missiles. Maverick missiles are one of the most versatile, precision strike missiles of all time. The Maverick's versatility, is in part, due to its ability to be fired from a number of aircraft against a variety of targets such as field fortifications, bunkers, hangarettes, tanks, armored personnel carriers, parked aircraft, radar or missile sites, port facilities, and ships, including high-speed patrol craft. Maverick's versatility is further enhanced by its guidance capabilities, which include a combination of TV, laser, and infrared guidance systems that allow for strategic operations to be conducted in day and night operations in a variety of atmospheric conditions.

Since the Maverick missile was developed during the early to mid-1970's, before the onslaught of digital electronics, Mavericks, like many legacy stores, are based on an analog system that requires extensive wiring, unique dedicated hardware and software, and specialty video processing circuitry in the host aircraft to fully integrate the store to the aircraft. Thus, a shortcoming associated with analog stores is that some type of interface is needed to enable the analog store to be used in connection with modern aircraft, while at the same time maintaining legacy store compatibility with legacy aircraft.

In view of the aforementioned shortcomings associated with the interface between legacy stores and modern aircraft, there is a strong need in the art for a dual interface between legacy stores and aircraft to overcome the problems set forth above. Moreover, there is a strong need in the art to maintain legacy store compatibility with legacy aircraft.

SUMMARY OF THE INVENTION

The present invention relates to a dual mode launcher that provides an interface from a modern aircraft or a legacy aircraft to a legacy store.

In one embodiment, the present invention relates to a launcher for providing communications between an associated aircraft and a legacy store, the launcher including: a first interface for receiving a digital control and a digital data signal from an aircraft; a means for converting the digital control signal or the digital data signal to an analog signal corresponding to digital control signal or the digital data signal; a store interface for communicating the analog signal to an associated store; and a means for providing information originating from the associated store for use by the associated aircraft through the first interface.

In another embodiment, the present invention relates to a launcher for launching an associated store from an associated aircraft, the launcher including: a dual mode launcher assembly for launching an associated store from an associated aircraft; a first interface and a second interface connected housed in at least a portion of the dual mode launcher assembly, wherein the first interface and the second interface are capable of exchanging information between the launcher and an associated aircraft having a hardware configuration, wherein either the first interface or the second interface is communicatively coupled to the associated aircraft based upon the hardware configuration of the associated aircraft; the dual mode launcher assembly further including a third interface for communicatively coupling the launcher to the associated store, in order to exchange information between the launcher and the associated store.

In another embodiment, the present invention relates to a method for communicating information between an associated aircraft and an associated store, the method including: selecting a first interface or a second interface of a launcher to communicatively coupled the launcher to an associated aircraft having a hardware configuration, wherein the selected interface is determined based upon the hardware configuration of the associated aircraft; communicatively coupling the launcher to an associated store through a third interface, wherein the third interface is capable of exchanging information between the launcher and the associated store, receiving information from the first or second interface; converting the received data from the associated aircraft to analog signals provided to the associated store; and converting analog signals originating from the associated store to digital signals provided to the associated aircraft.

In another embodiment, the present invention relates to a method for communicating information between an associated aircraft and an associated store, the method including: receiving at least one analog signal from an associated store, wherein the at least one analog signal relates to a physical characteristic of the associated store; converting at least one of the at least one analog signal received from the associated store to at least one digital signal corresponding to the physical characteristic of the associated store; and translating the at least one digital signal corresponding to the physical characteristic of the store for use by an associated aircraft having a digital interface.

In another embodiment, the present invention relates to a method for communicating information between an associated aircraft and an associated store, the method including: receiving information in the form of at least one digital signal from an associated aircraft; converting the at least one digital signal received from the associated aircraft to a least one analog signal; and translating the at least one digital signal corresponding to the information received from the associated aircraft for use by an associated store.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

FIG. 1 is a schematic fragmented elevational view of an aircraft with a launcher and an associated store removably affixed to its wing;

FIG. 3 is a block diagram of the physical architecture of the dual mode launcher assembly in accordance with one aspect of the present invention.

DETAILED DESCRIPTION OF THE INVENTION

Figure 2A:
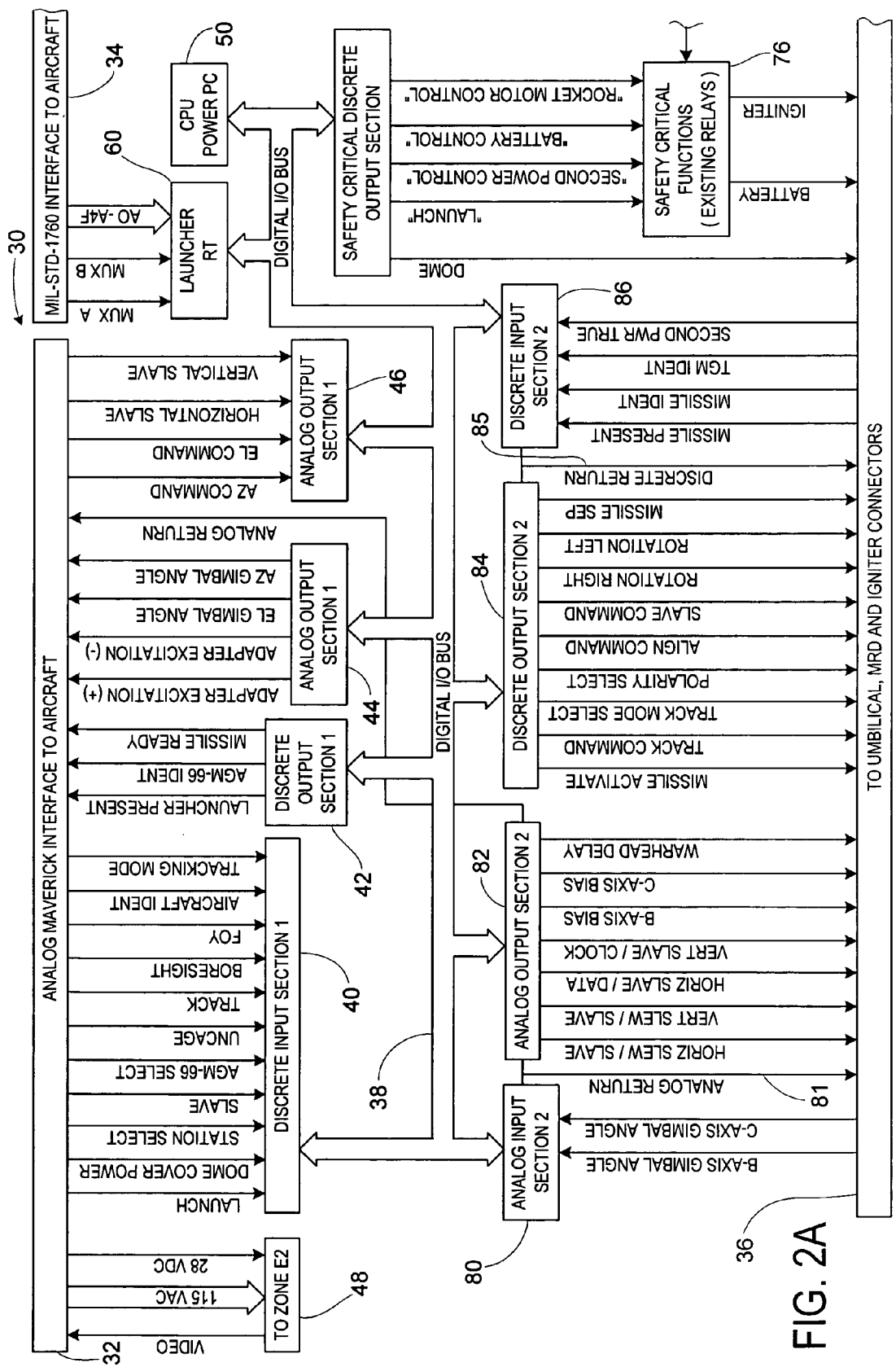
FIGS. 2A and 2B are a block diagrams of the logical architecture of a dual mode launcher assembly in accordance with one aspect of the present invention.

The present invention will now be described with reference to the drawings, wherein like reference numerals are used to refer to like elements throughout.

Referring now to FIG. 1, a portion of an aircraft 10 having a fuselage 12 and a wing 14 extending therefrom is shown. The aircraft 10 can be any type of aircraft, including, fighter jets (e.g., the A-10, F-15 and F-16) and helicopters (e.g., AH-64 and AH-1). Extending downwardly from the wing 14 is a bomb rack 16, a launcher 18 attached to the bomb rack 16, and a store 20 (also commonly referred to as a missile) supported from the launcher 18. The bomb rack 16 can be any type of bomb rack, including bomb racks capable of storing a single store or multiple stores. Likewise, while the launcher 18 has been described as being attached to the bomb rack, the launcher 18 may instead be supported from the fuselage 12 or the launcher 18 may extend from a wingtip or other location on the aircraft 10.

The store 20 may be any type of store capable of being carried by an aircraft 10, including an air-to-air missile or an air-to-surface missile. As an example, the store 20 is a member of the Maverick family of missiles, manufactured by the assignee of the present application, Raytheon Company of Lexington, Mass.

As shown in FIG. 1, a dual mode launcher assembly 30 comprises at least a portion of the launcher 18. The dual mode launcher assembly 30 may be removably attached to the launcher 18 or may be integral to the launcher 18. Preferably, the dual mode launcher assembly 30 is housed within the launcher 18. However, the dual mode launcher assembly 30 may also be housed externally to the launcher 18 (e.g., the dual mode launcher assembly 30 may be located on the wing 14, the fuselage 12 or within the store 20).

Figure 2B:
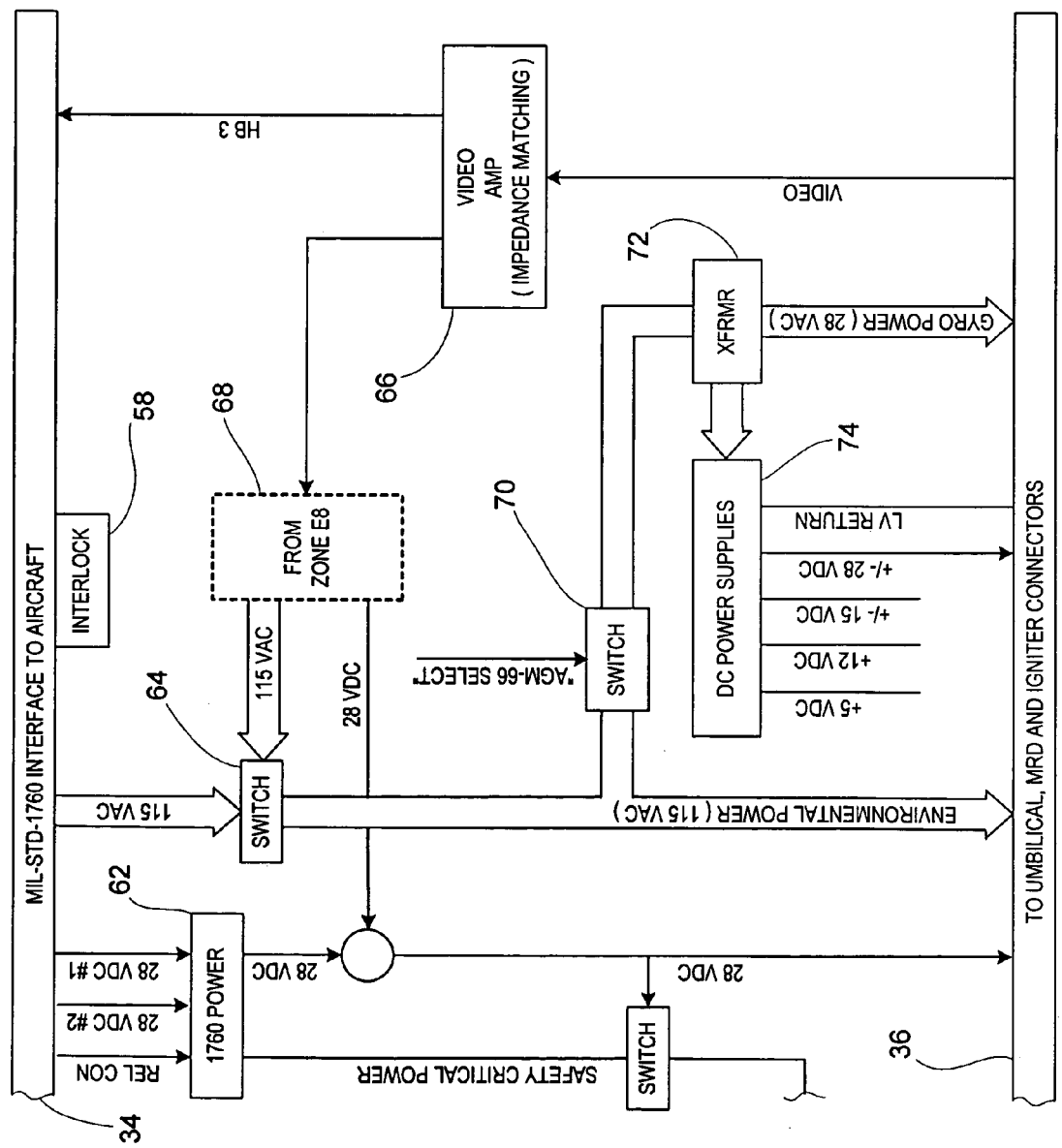

Referring to FIGS. 2A and 2B, block diagrams of the logical architecture of the dual mode launcher assembly 30 in accordance with one aspect of the present invention is shown. The dual mode launcher assembly 30 includes an analog interface 32 (also referred to as a legacy interface) and a digital interface 34 (also known as an MIL-STD-1760 compliant interface). Each of these interfaces may be used to interconnect the dual mode launcher assembly 30 to the aircraft 10. The selection of the appropriate interface (analog 32 or digital 34) is based upon the type of aircraft 10 in which the launcher and store is connected. For example, if the aircraft 10 is designed for an analog interface to the launcher 18 and associated store 20, the analog interface 32 will be used connect the dual mode launcher assembly 30 to the aircraft 10. Likewise, if the aircraft 10 is designed for a digital interface to the launcher 18 and associated store 20, the digital interface 34 will be used to connect the dual mode launcher assembly 30 to the aircraft 10.

The dual mode launcher assembly 30 further includes a store interface connector 36 for communicating various signals (e.g., command, status and video) between the dual mode launcher assembly 30 and an associated store 20. As discussed in more detail below, the dual mode launcher assembly 30 permits aircrafts having a digital interface or an analog interface to seamlessly communicate with a legacy store.

Referring to FIGS. 2A and 2B, information received from either the analog interface 32 or the digital interface 34 is converted to a digital signal to be placed on the digital input/output bus 38. The digital input/output bus 38 is utilized to communicate signals from the analog interface 32 and the digital interface 34 to the store interface 36. The store interface connector 36 is also capable of transmitting signals (e.g., status and video) from the associated store 20 to the appropriate analog interface 32 or digital interface 34 through the digital input/output bus 38. Since the legacy store 20 is generally an analog system, the signals originating from the store 20 are converted to digital signals prior to transmission to the digital input/output bus 38. If the digital signals are required to be communicated to the analog interface 32, the digital signals are converted to analog for use by the aircraft 10. The operation of the digital input/output bus 38 is controlled by the CPU power PC 50.

As stated above, aircraft 10 communicates to an associated store 20 either through an analog (legacy) interface 32 or a digital interface 34 (compliant with MIL-STD-1760). If the communication between the aircraft 10 and the store 20 is required to be analog, the store 20 will interface to aircraft 10 through store interface 36 and analog interface 32. Likewise, if digital communications is required, aircraft 10 and store 20 will interface through store interface 36 and digital interface 34. When a particular connector (not shown) for the analog interface 32 or the digital interface 34 is not in use, the connector may be conveniently stowed within the body of the launcher 18, or in some other convenient location. For example, if the aircraft 20 is expecting to receive analog signals from the store 20, the connector associated with the digital interface 34 is stowed in the launcher 18. Likewise, if the aircraft 10 is expecting to receive digital signals from the store 20, the connector associated with the analog interface 32 is stowed in the launcher 18.

The dual mode launcher assembly 30 outputs signals to the store interface 36 that matches the signals that the store 20 is expecting. Regardless of the interface source (analog interface 32 or digital interface 34), the received data by the dual mode launcher assembly 30 is converted or synthesized for use on the digital input/output bus 38. Once the received data is placed on the input/output bus 38, the data may be subsequently converted to analog for use by the store 20. For instance, if the aircraft 10 is connected to digital interface 34, the dual mode launcher assembly 30 synthesizes the data (adjusts amplitude), places the data on the input/output bus 38 and subsequently translates those digital signals received from the aircraft 10 to correspond to the analog signals that the store 20 is expecting. Likewise, if the aircraft 10 is connected to analog interface 32, the dual mode launcher assembly 30 converts the data to digital, places the data on the input/output bus 38 and subsequently translates the digital signals corresponding to the analog signals received from the aircraft 10 to the analog signals that the store 20 is expecting.

Operation of the dual mode launcher assembly 30 will now be discussed. Operation of the dual mode launcher assembly 30 in analog or legacy mode will duplicate the external interface characteristics of the legacy launcher. For example, when the store 20 is a Maverick missile, the dual mode launcher assembly 30 will duplicate the external interface characteristics of the LAU-117A(V)3/A Launcher (the Maverick native (or legacy) analog interface).

As shown in FIGS. 2A and 2B, various input signals are received at discrete input 40 from the analog interface 32. These signals include: LAUNCH, DOME COVER POWER, STATION SELECT, SLAVE, AGM-66 SELECT, UNCAGE, TRACK, BORESIGHT, FOY, AIRCRAFT IDENT, and TRACKING MODE. Analog input 46 also receives various input signals from the analog interface 32. These signals include: AZ COMM AMO, EL COMM AMO, HORIZONTAL SLAVE and VERTICAL SLAVE. The above designated signals received from analog input 46 are sensed through comparators or analog inputs and converted to digital signals. Once the signals are converted to digital, the signals may be placed on the digital input/output bus 38 at the desired time for use as needed.

During analog operation (i.e., when the aircraft 10 is connected to the analog interface 32), the dual mode launcher assembly 30 is capable of transmitting various information received from the store 20 (through the digital input/output bus 38) to the to the aircraft 10 via the analog interface 32. In particular, discrete output 42 transmits the following signals to the aircraft 10: LAUNCHER PRESENT, AGM-65 and MISSILE READY. Likewise, analog output 44 outputs the following information to the aircraft 10 via the analog bus 32: ADAPTER EXCITATION (+), ADAPTER EXCITATION (−), EL GIMBAL ANGLE, and AZ GIMBAL ANGLE. Depending on the signal, the signals transmitted from the discrete output 42 and analog output 44 to the analog interface 32 will be synthesized through solid state relays and converted to analog by digital to analog (D/A) circuits controlled and monitored by the onboard microcontroller (not shown). In the analog mode, operation of the dual mode launcher assembly 30 is transparent to the user, but will be controlled internally by software rather than relays and discrete logic.

As shown in FIGS. 2A and 2B, the analog interface 32 further transmits inputs for 115 V AC and 28 V DC to the box designated TO ZONE E2 48. In addition, the analog interface 32 further receives a VIDEO signal from TO ZONE E2 48. These signals are illustrated to clarify that the designated inputs are maintained on the analog interface 32 (i.e., the analog interface 32 includes power signals (e.g., 115 V AC and 28 V DC) and video signals (e.g., VIDEO). Thus, dual mode launcher assembly 30 permits users of legacy aircraft to maintain the full capabilities of a conventional legacy launcher.

Operation of the dual mode launcher assembly 30 in digital mode will now be discussed. For operations in the digital mode, the aircraft 10 must generally be compliant with MIL-STD-1760. Communications associated with the digital mode occur through digital interface 34 and store interface 36. Generally, during operation in digital mode, all inputs from the store will be sensed through comparators or analog inputs (A/D), and all outputs to the missile will be synthesized through solid state relays and analog output (D/A) circuits controlled and monitored by the onboard microcontroller (not shown).

All inputs from the aircraft 10 are transmitted to dual mode launcher assembly 30 via MIL-STD-1553 digital data receive type messages. The bits in these messages generally have a one-to-one correspondence to the signals of the legacy interface. For example, a TRUE state on an analog discrete line will be handled by the launcher services processor (LSP) 92 (shown in FIG. 3) software exactly the same way as a logical "1" for the corresponding bit in the MIL-STD-1553 data word. Likewise, outputs to the aircraft 10 will be via MIL-STD-1553 digital data transmit type messages. The data contained in these messages will correspond to the information normally available over the legacy interface.

As shown in FIGS. 2A and 2B, digital data transmitted from the aircraft 10 to the dual mode launcher assembly 30 is received by Launcher RT 60 through redundant signal lines MUX A and MUX B. Launcher RT 60 is a two-way bus that receives various signals, including MUX A, MUXB and A0–A4 F. The Launcher RT 60 is capable of receiving information from the aircraft 10, and transmitting information to the aircraft 10. The actual digital data received and transmitted by the launcher RT 60 is represented by the MUX A and MUX B signals. The A0–A4 F signal essentially provides addressing information to the Launcher RT 60. In turn, the Launcher RT 60 performs impedance matching to ensure that the digital data has the proper amplitude. Once synthesized, the MUX A and MUX B data are placed on the input/output bus 38 for use as needed.

As shown in FIGS. 2A and 2B, 1760 Power 62 receives the following standardized power signals as set forth in MIL-STD-1760: REL CON, 28 VDC #2, and VDC #1 from the digital interface 34. Two signals are output from the 1760 Power 62. One signal is directed to switch 78 and the other signal is transmitted to the junction 63. The output of switch 78 is input to Safety Critical Function 76 to ensure a redundant power is received at the Safety Critical Function 76. The output of junction 63 is made available to the store 20 through the store interface 36.

Switch 64 receives a 115 V AC signal from the digital interface 34. Switch 64 also receives a 115 V AC signal From Zone E8 68. Switch 64 determines which type of aircraft the launcher dual mode launcher assembly 30 is connected. If switch 64 does not receive a signal called "Power Reset" (not shown), switch 64 will determine that the aircraft 10 is analog. This is done by detecting a 115 V AC originating from the analog interface 32. If it is determined that the aircraft is analog, 115 V AC signal is disconnected from the connector associated with the digital interface 34.

Safety Critical Discrete Output Section 88 is connected to the digital input/output bus 38. The Safety Critical Discrete Output Section 88 receives commands from the aircraft and, if appropriate, transmits the following signals to the Safety Critical Functions 76: LAUNCH, SECOND POWER CTRL, BATTERY CONTROL, ROCKET MOTOR CTRL. Once these signals are transmitted to the Safety Critical Functions 76, if all the prerequisites are satisfied, a signal to the BATTERY and IGNITER are transmitted to the store 20 through store interface 36 for ignition of the store 20. As shown in FIGS. 2A and 2B, Safety Critical Discrete Output Section 88 further outputs a "DOME" signal to the store interface 36.

Video Amp 66 transmits video from the store interface 36 to the digital interface 34. As discussed more fully below, the video amp 66 is capable of receiving legacy video signals and converting those signals to RS-170 video signals in real time for display to the user on a cockpit display. The video amp 66 provides an input to FROM ZONE E8 68. If the output of box 68 is 115 V AC, the aircraft 10 is analog (as discussed above), otherwise, if the output of box 68 is 28 V DC, then the aircraft 10 is digital. If the aircraft 10 is analog, power supplied to switch 70 may be selectively routed to XFRMR 72, DC Power Supplies 74 to the store interface 36.

Finally, an interlock 58 is shown in FIGS. 2A and 2B. The interlock 58 monitors the mated status of the connectors associated with the digital interface 34.

The signals received and transmitted by the store interface 36 will now be discussed. From analog output 82 a variety of signals, including HORIZ SLEW/SLAVE, VERT SLEW/SLAVE, HORIZ SLAVE/DATA, VERT SLAVE/CLOCK, B-AXIS BIAS, C-AXIS BIAS and WARHEAD DELAY are transmitted to store bus 36. Likewise, the following signals are transmitted to the store bus 36 through discrete output 84: MISSILE ACTIVATE, TRACK COMMAND, TRACK MODE SELECT, POLARITY SELECT, ALIGN COMMAND, SLAVE COMMAND, ROTATION RIGHT, ROTATION LEFT, and MISSILE SEP.

Furthermore, an analog return signal 81, which is connected to analog input section 2 80 and analog output section 2 exchanges information between the store interface 36 and the analog interface 32.

As discussed above, the store interface 36 also receives the following signals from the Safety Critical boxes 88 and 76: DOME, BATTERY, and IGNITER. In addition, a 28 V DC power signal from junction 63 or switch 64 may also be received by the store interface 34 depending on the operation mode (analog or digital). Likewise, a ±30 V DC signal is received from DC Power Supplies 74 and a 26 V AC signal is received from the XFRMR 72. A discrete return signal 85 is also connected to discrete output section 84 and discrete input section 86 and connects directly to store interface 85.

The store interface 36 is capable of receiving information from the store 20 and transmit the information to the active analog interface 32 and/or digital information 34. In particular, the store interface 36 transmits B-AXIS GIMBAL ANGLE and C-AXIS GIMBAL ANGLE signals to analog input 80. Likewise, the store interface 36 transmits MISSILE PRESENT, MISSILE IDENT, TGM IDENT, and SECOND PWR TRUE signals to discrete input 86. The store interface 36 also transmits the LV RETURN signal to DC Power Supplies 74 and VIDEO signal to Video Amp 66.

In the digital mode, there are several advanced features available for operating the dual mode launcher assembly 30, which are generally not available during analog operation.

1. Real time built-in-test (BIT) feedback: results of the launcher periodic built in test (PBIT) operations are available over the 1553 data bus. BIT results are also recorded in the dual mode launcher assembly 30 (even for legacy mode operation) and are available for post mission download using the MIL-STD-1760 mass data transfer protocol.
2. Enhanced data from the missile: information about the internal state of the missile is displayed as bar coded data on the video display is available for some Maverick variants. The dual mode launcher assembly 30 will decode this data and have it available over the 1553 data bus to provide real time feedback to the operator regarding the quality of specific missile operations.
3. Mission data recording: the bar coded data, even if not used by the aircraft 10, will be recorded into dual mode launcher assembly 30 memory (not shown) using a five (5) second circular buffer. Post mission download of this data will be available using the MIL-STD-1760 mass data transfer protocol.
4. Launcher software update: launcher software can be updated in the field using standard MIL-STD-1760 test equipment.
5. RS-170 compliant video: the dual mode launcher assembly 30 will convert the Maverick video, frame by frame, into a video signal that is compliant with the RS-170 standard. Up to 16 frames of video will be stored for upload (via MIL-STD-1553) or video display.

Thus, while it is important to maintain backward compatibility with analog aircraft, the present invention provides additional benefits available through implementation of the MIL-STD-1760 standard.

Referring to FIG. 3, the physical architecture of the dual mode launcher assembly 30 is shown in block diagram form. The dual mode launcher assembly 30 includes a launcher input board (LIB) 90, launcher services processor (LSP) 92 and launcher output board (LOB) 94.

The LIB 90 is the primary interface from inputs originating from both the legacy aircraft interface (identified by J1) and the store 20 to dual mode launcher assembly 30 interface (J2). In particular, the LIB 90 performs the following functions: 1) converts the 28 V direct current signal into a +5 DC signal and a +/−15 V DC signal for use by the three dual mode launcher assembly circuit boards (90, 92, and 94), as shown in FIG. 3; 2) translates the analog levels presented over the legacy aircraft and missile interfaces into logical TRUE/FALSE data entities that can be interpreted by the LSP 92; 3) autonomously collects and buffers the logic level input data for use by the LSP 92; 4) converts the analog gimbal angle signal, slew commands, slave commands, and warhead fuze delay signals to 12 bit digital signals for use by the LSP 92; and 5) creates an internal, protected, "Release Power" source from either the analog interface 32 or the digital interface 34, identified on FIGS. 2A and 2B.

The launcher output board (LOB) 94 is the primary interface for outputs coming from the dual mode launcher assembly 30 to both the analog interface 32 and store interface 36. In particular, the LOB 94 translates logical TRUE/FALSE data entities furnished by the LSP 92 into analog levels that can be understood over the legacy aircraft and store interfaces 32, 36. The LOB 94 further converts the 12-bit digital signals provided by the LSP 92 into the analog gimbal angle, slew commands, slave commands and warhead fuze delay signals. In addition, the LOB 94 uses the internal, protected, "Release Power" source to initiate the launch sequence when all prerequisites are met.

The LSP 92 controls the functionality of the dual mode launcher assembly 30. For example, if the store 20 is a Maverick missile, the LSP 92 controls all dual mode launcher assembly 30 functions and the Maverick signal set manipulations. In particular, the LSP 92 controls the following functions: 1) determines one of three operating modes, analog mode, digital mode, or memory loader/verifier mode; 2) monitors the state of aircraft 10 power via the LIB 90; 3) monitors the state of aircraft input discretes 40 (shown in FIGS. 2A and 2B) (either via 1553 message or from LIB 90); 4) monitors the state of store input discretes 86 via LIB 90; runs internal state machine that mimics the operation of the analog interface (e.g., LAU-117A(V)3/A); 5) drives the state of aircraft output discretes 42 (either via 1553 message or from output board 94; 6) monitors the current state of the dual mode launcher assembly 30; 7) autonomously monitors and summarizes key weapon status information (e.g., video Bar Code information); and 8) provides built-in-test and error reporting.

The LSP 92 includes four (4) major subsystems: a microcontroller; a MIL-STD-1553 RT communications device; a timer and interrupt controller; and video interface. These subsystems work together under the discretion of the computer software configuration item to accomplish all of the communication, control, and monitoring functions required within the dual mode launcher assembly 30.

The microcontroller is preferably a Motorola MPC-555 microcontroller with one board dual Controller Area Network (CAN) controllers, 26 KB of internal static RAM and 448 KB of flash memory. The microcontroller controls all operations within the dual mode launcher assembly 30 according to the dual mode launcher assembly 30 CSCI and the communications protocol.

The MIL-STD-1553 RT communications device includes a controller and a random access memory section that is shared with the MPC-555 microcontroller. The MIL-STD-1553 RT communications device communicates with the aircraft 10 and handles all message traffic to and from the aircraft 10 to the signal set control and monitoring functions associated with the store 20.

The timer and interrupt controller function generates a periodic interrupt to maintain information about the current state of the dual mode launcher assembly 30 and all weaponry carried thereon, including one or more stores 20. The timer and interrupt controller function also provides interrupts that signal the receipt of aircraft messages into the receiver/transmit data signals of the LSP 92, internal communication errors, and a watchdog timer function. These interrupt signals form the basic backbone from the dual mode launcher assembly 30 communication functions.

The video interface function converts the native video signals of the legacy store coverts the native store video into an RS-170 compliant signal for use over the MIL-STD-1760 HB3 interface. In addition, the video interface function decodes store 20 information available in the bar code for use over the MIL-STD-1760 HB3 interface and also transmits the extracted information to a circular data recorder for post-mission data analysis. The video interface function maintains a separate video processor digital circuitry, which provides an added benefit that there is only a small amount of software or performance loading occurring on the microcontroller.

In addition, the LSP 92 has built in recording capability, which allows provides the ability of the dual mode launcher assembly 30 to record all of the information available at the store 20, as well as the aircraft 10, including status, control information, and video information. This feature enables a complete review of the flight, up until the point of store 20 release, and can be downloaded from the dual mode launcher assembly 30 and reviewed during debriefing when desired.

In operation, the firmware associated with the dual mode launcher assembly 30 utilizes an initialization process that sets up all of the initial conditions for operation. This includes configuration of the LSP 92 RAM, timers, and interrupt controller. All legacy outputs are initialized to an all off ("safe") state. The MIL-STD-1553 RT device is initialized to communicate with the aircraft. If it is determined that there is no MIL-STD-1760 interface connected (i.e., all address lines are open), the LSP 92 will operate in legacy mode. All launcher monitor messages are initialized to an off ("safe") state.

The dual mode launcher assembly 30 operates as a controller for weapons carried on the Maverick Launch Assembly. All functions remain under the control of the host aircraft SMS. The dual mode launcher assembly 30 receives MIL-STD-1553 messages from the aircraft and then acts upon these messages in accordance with the requirements of Maverick Launcher Interface Description Document (IDD), which defines specific control and monitoring message protocols. The IDD includes the dual mode launcher assembly 30 specific messages identified in Table 1.

TABLE 1

Dual Mode Launcher Messages

| Message Name | Subaddr. | DW Count | Description |
| --- | --- | --- | --- |
| Aircraft ID/Store Location | 1R | 5 | Provides launcher host aircraft and location information. |
| Store Description | 1T | 30 | Provides Maverick System store identification and configuration to the host aircraft. |
| Launcher Control (LCM) | 10R | 12 | Provides capability to control functions of the dual mode launcher assembly. |
| Launcher Monitor (LMM) | 10T | 12 | Provides capability to monitor the status of the dual mode launcher assembly and carried weapon. |
| Launcher Store Control (LSC) | 11R | 30 | Provides the MIL-STD-1760 compliant message required to initiate launch. |
| Launcher Store Monitor (LSM) | 11T | 30 | Provides the MIL-STD-1760 compliant message required to monitor launch. |
| Transfer Data | 13R/T | 30 | Required for MDT. |
| Transfer Control | 14R | 8 | Required for MDT. |
| Transfer Monitor | 14T | 9 | Required for MDT. |
| Data Wraparound | 30R/T | 30 | Provides closed-loop data transfer integrity verification test. |

After initialization, dual mode launcher assembly 30 LSP software begins a main process that simply waits for commands from the aircraft, continuously assess the health (PBIT) and service the internal interrupts. Three interrupt driven processes are utilized within the dual mode launcher assembly 30 LSP 92. That is, each process is only invoked when the specific event which the process is designed to handle does occur.

A receive/transmit interrupt process is responsible for handling each message received in the RT LSP 2 from the aircraft 10. Each time a message is received from the aircraft 10, this process is invoked to check for errors and to handle the message according to the communications protocol. The process handles all aspects of the message from verifying the message validity to setting the state of internal variables based on the content of the control message.

A timer interrupt process is initiated every 10 ms while power is applied to the dual mode launcher assembly 30. The primary responsibility of the timer interrupt process is to generate the correct launcher responses to inputs over either aircraft interface 32, 34. An internal state machine is updated during this process to handle the transitions from current state to next state based on inputs from the aircraft 10, inputs from the store 20, and internal status and timing signals. For example, the following signals are updated every 10 ms: 1) analog and discrete outputs to the store; 2) analog and discrete inputs from the store; 3) analog and discrete inputs from the aircraft (only if in legacy mode); 4) analog and discrete outputs to the aircraft (only if in legacy mode); 5) outputs to the igniter assembly (during launch sequence); and 6) internal status and BIT results.

The timer interrupt process is also responsible for generating a current LMM message every 10 ms. This process assembles a LMM with the current state of all of the internal data entities. The process places this message into the LSP 92 RT hybrid's shared RAM so that when the aircraft 10 commands the dual mode launcher assembly 30 to send a LMM message, the most current status information will be available.

The dual mode launcher assembly 30 further provides a watchdog timer. The watchdog timer will timeout, signifying a firmware or processor problem and setting the subsystem flag and processor non-maskable interrupt (NMI), if it is not reset at least every 1.6 seconds. Firmware is designed to reset the watchdog timer during each 10 ms status update. Execution of the NMI routine will log the fault, save all outputs and halt all further processing until power is removed and then re-applied to the dual mode launcher assembly 30.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A dual mode launcher comprising:
a first interface for receiving a digital control signal for operation in a first standard mode from an associated aircraft;
a second interface for receiving an analog control signal for operation in a second mode from the associated aircraft, wherein the second mode is a predetermined mode based upon a hardware configuration of an associated weapon store and wherein, the dual mode launcher is operative in the first standard mode when the first interface is connected to the associated aircraft and the dual mode launcher is operative in the second mode when the second interface is coupled to the associated aircraft; and
firmware selectively operable between the first standard mode and the second mode to facilitate communication between the associated aircraft and the associated store through a store interface based upon connection of the first or second interface to the associated aircraft.

2. The dual mode launcher of claim 1, further comprising a means for providing information originating from the associated store for use by the associated aircraft through the first interface.

3. The dual mode launcher of claim 1, wherein the first interface is electrically connected in parallel to the second interface.

4. The dual mode launcher of claim 1, wherein the first interface and the second interface are communicatively coupled to a bus.

5. The dual mode launcher of claim 1, wherein the digital control signal received through the first interface corresponds to an analog signal for use by the associated store.

6. The dual mode launcher of claim 1, wherein information originating from the associated store includes video information.

7. The dual mode launcher of claim 6, wherein the video information received from the associated store is converted to RS-170 video data for use by a user in the associated aircraft.

8. The dual mode launcher of claim 1, wherein information originating from the associated store includes a status signal corresponding to a physical state of the associated store.

9. The dual mode launcher of claim 1, wherein the firmware for converting includes an analog to digital converter.

10. The dual mode launcher of claim 1, wherein the first mode is compatible with a digital mode.

11. The dual mode launcher of claim 10, wherein the first interface includes a first connector and the second interface includes a second connector, wherein either the first connector or the second connector is used to communicatively couple the dual mode launcher to the associated aircraft.

12. The dual mode launcher of claim 11, wherein the non-communicatively coupled connector corresponding to either the first or second connector is stored within the dual mode launcher.

13. A dual mode launcher for launching an associated store from an associated aircraft, the dual mode launcher comprising:
a dual mode launcher assembly for launching an associated store from an associated aircraft;
a first interface for operation in a first standard mode and a second interface for operation in a second mode, wherein the first and second interfaces are housed in at least a portion of the dual mode launcher assembly, wherein the first interface and the second interface are capable of exchanging information between the launcher and an associated aircraft having a hardware configuration, wherein when the first interface is communicatively coupled to the associated aircraft, the first mode is operative and when the second interface is communicatively coupled to the associated aircraft the second mode is operative;
the assembly further including a store interface for communicatively coupling the launcher to the associated store, in order to exchange information between the dual mode launcher and the associated store.

14. The dual mode launcher of claim 13, wherein the information includes control information.

15. The dual mode launcher of claim 13, wherein the information includes status information related to the associated store.

16. The dual mode launcher of claim 13, wherein the information includes video information.

17. The dual mode launcher of claim 16, wherein the video information is in a digital format.

18. The dual mode launcher of claim 17, wherein the digital format is RS-170.

19. The dual mode launcher of claim 13, wherein the launcher and the assembly are integral.

20. The dual mode launcher of claim 13, wherein the launcher and the assembly are removably attached.

21. The dual mode launcher of claim 13, wherein the associated store is a missile.

22. The dual mode launcher of claim 21, wherein the associated store is a Maverick missile.

23. A method for communicating information between an associated aircraft and an associated store, the method comprising:
   communicatively coupling a dual mode launcher having a digital interface, an analog interface and a store interface to an associated aircraft having a hardware configuration, wherein either a digital connector associated with the digital interface or an analog connector associated with the analog interface is coupled to the aircraft based on the hardware configuration of the associated aircraft;
   communicatively coupling the dual mode launcher to an associated store through the store interface, wherein the store interface is capable of exchanging information between the dual mode launcher and the associated store,
   receiving information from either the digital or the analog interface that is communicatively coupled to the associated aircraft;
   converting the received data from the associated aircraft to analog signals provided to the associated store; and
   converting analog signals originating from the associated store to digital signals provided to the associated aircraft.

24. A method for communicating information between an associated aircraft and an associated store, the method comprising:
   communicatively coupling a dual mode launcher having a digital interface, an analog interface and a store interface to an associated aircraft having a hardware configuration, wherein either the digital interface or the analog interface is coupled to the aircraft based on the hardware configuration or the associated aircraft;
   receiving at least one analog signal from an associated analog store, wherein the at least one analog signal relates to a physical characteristic of the associated analog store;
   converting at least one of the at least one analog signal received from the associated analog store to at least one digital signal corresponding to the physical characteristic of the associated store; and
   translating the at least one digital signal corresponding to the physical characteristic of the store for use by the associated aircraft having a digital interface.

25. A method for communicating information between an associated aircraft and an associated analog store, the method comprising:
   communicatively coupling a dual mode launcher having a digital interface, an analog interface and a store interface to an associated aircraft having a hardware configuration, wherein either the digital interface or the analog interface is coupled to the aircraft based on the hardware configuration or the associated aircraft;
   receiving information in the form of at least one digital signal from the associated aircraft;
   converting the at least one digital signal received from the associated aircraft to a least one analog signal; and
   translating the at least one analog signal corresponding to the information received from the associated aircraft for use by an associated analog store.

* * * * *